United States Patent [19]
Blom

[11] 3,933,331
[45] Jan. 20, 1976

[54] SEAT ADJUSTER MECHANISM

[75] Inventor: Hubert P. Blom, Royal Oak, Mich.

[73] Assignee: General Motors Corporation, Detroit, Mich.

[22] Filed: Nov. 25, 1974

[21] Appl. No.: 526,832

[52] U.S. Cl. .................. 248/425; 248/430; 297/349
[51] Int. Cl.² ......................................... F16M 13/00
[58] Field of Search .................... 248/371, 393–397, 248/157, 419, 420, 424, 425, 429, 430; 296/65 R; 297/344, 349

[56] References Cited
UNITED STATES PATENTS

| | | | |
|---|---|---|---|
| 1,903,267 | 3/1933 | Roberts | 297/349 X |
| 2,256,023 | 9/1941 | Harmon | 248/425 |
| 2,670,028 | 2/1954 | Doty et al. | 248/425 |
| 2,681,687 | 6/1954 | Haltenberger | 248/425 |
| 2,681,688 | 6/1954 | Haltenberger | 248/425 |
| 2,820,506 | 1/1958 | Duluk et al. | 248/419 X |
| 2,826,241 | 3/1958 | Himka | 296/65 R X |
| 2,851,083 | 9/1958 | Rhodes | 297/349 X |

Primary Examiner—Roy D. Frazier
Assistant Examiner—Lawrence J. Staab
Attorney, Agent, or Firm—C. E. Leahy

[57] ABSTRACT

A seat adjuster mechanism for a bench-type vehicle seat includes a first adjuster track assembly mounting the driver's end of the vehicle seat to the vehicle and a second adjuster track assembly mounting the passenger's end. The track assemblies are curved about an axis extending transversely of the vehicle so that the pitch and elevation of the vehicle seat are changed as the seat is adjusted fore and aft. First and second swivel mechanisms connect the respective adjuster track assemblies to the vehicle seat. First and second lock pawls are associated respectively with the first and second adjuster track assemblies for selective engagement in notches in a notched lock bar to latch the seat in desired position. A latch operating device is provided which is actuable in one direction to unlatch both the first and second latch means to permit simultaneous bodily fore and aft adjusting movement of the seat on the first and second adjuster track assemblies. The latch operating device is actuatable in the other direction to unlatch only the first lock pawl of the first adjuster track assembly to permit forward adjusting movement of the driver's end only.

2 Claims, 11 Drawing Figures

NORMAL ADJUST ← → SWIVEL ADJUST DRIVERS END ONLY

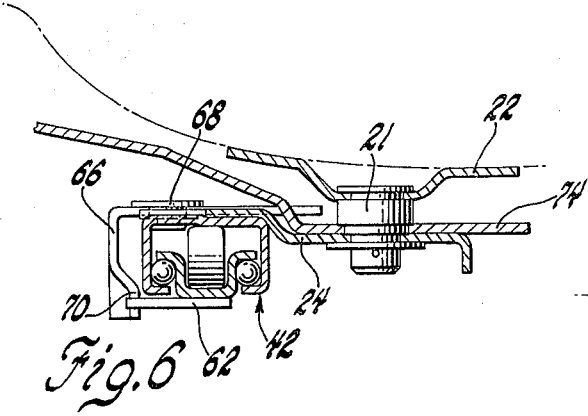
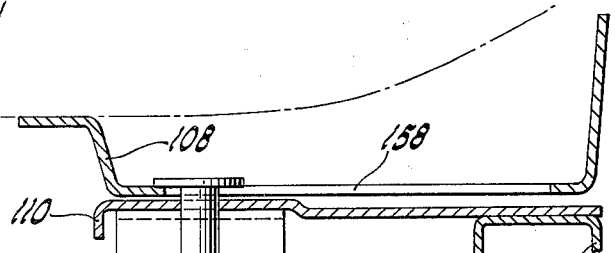
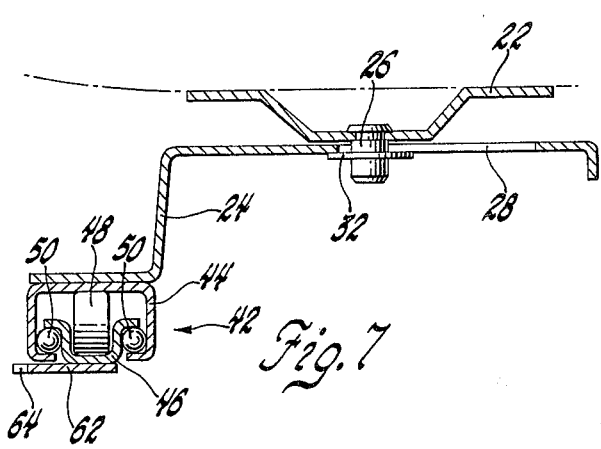
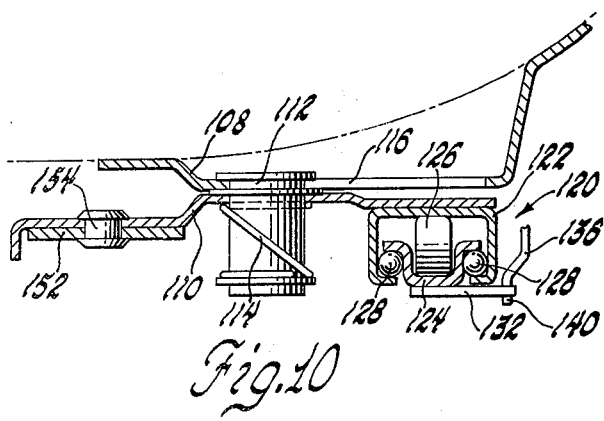
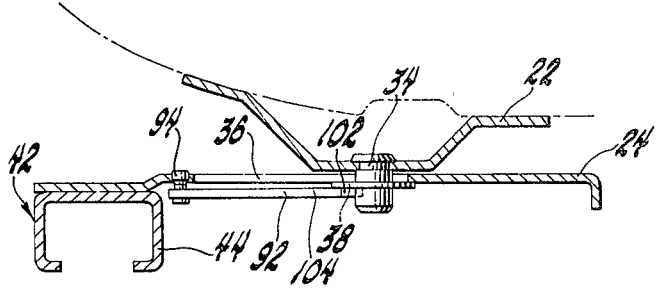
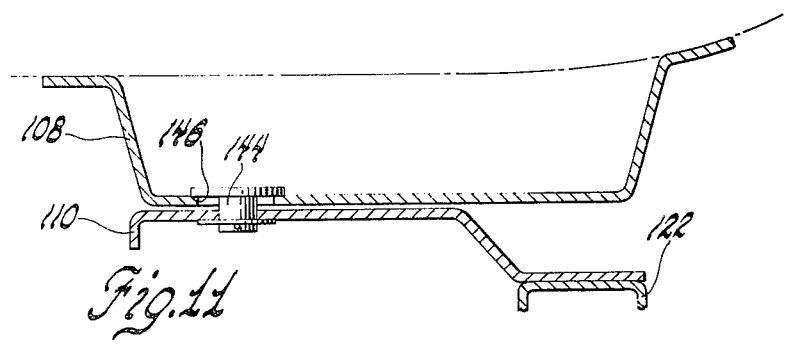

SEAT ADJUSTER MECHANISM

The invention relates to a seat adjusting mechanism for a vehicle seat and more particularly to an adjuster mechanism which permits one end of the seat to swivel forward to facilitate access to a second seat situated behind the one end of the seat.

It is desirable in two-door motor vehicles to provide a vehicle seat which can be moved to facilitate access to the rear seat of the vehicle. In vehicles having a bench-type front seat, the access to the rear seat is typically facilitated by providing separate seat backs at the driver's and passenger's ends of the bench seat. These seat backs are individually hinged for forward tilting movement to an easy access position.

The present invention relates to a seat adjusting mechanism which facilitates access to a rear seat by permitting one end of the bench-type vehicle seat to be adjusted forwardly on its adjuster track assembly while the adjuster track assembly at the other end of the vehicle seat remains latched.

According to the present invention, a first adjuster track assembly mounts the driver's end of the vehicle seat to the vehicle and a second adjuster track assembly mounts the passenger's end. The track assemblies are curved about an axis extending transversely of the vehicle so that the pitch and elevation of the vehicle seat are changed as the seat is adjusted fore and aft. First and second swivel mechanisms connect the respective adjuster track assemblies to the vehicle seat. First and second lock pawls are associated respectively with the first and second adjuster track assemblies. A latch operating device is provided which is actuatable in one direction to unlatch both the first and second latch means to permit simultaneous bodily fore and aft adjusting movement of the seat on the first and second adjuster track assemblies. The latch operating device is actuatable in the other direction to unlatch only the first lock pawl of the first adjuster track assembly to permit forward adjusting movement of the driver's end only. The vehicle seat swivels relative the first and second adjuster track assemblies as permitted by the first and second swivel devices. The second swivel device permits simultaneous pivoting and lateral shifting movement of the passenger's end of the seat as well as permitting the passenger's end of the seat to pitch forward as defined by forward adjusting movement of the driver's end of the seat on the curved first adjuster track assembly. A blocking link device is associated with the first swivel means and prevents return of the latch operating means to its normal position permitting latching of the first latch means until the first adjuster track assembly has returned the driver's end of the seat to its fore and aft position aligned with the position of the second adjuster track assembly.

One feature of the invention is the provision of seat adjusting mechanism which permits one end of the seat to be moved forwardly on the seat adjuster track to facilitate access to the rear seat.

Another feature of the invention is the provision of a swivel mechanism in connection between a seat and a seat adjuster track assembly which allows the seat to pitch forwardly as only one end of the seat is adjusted forwardly on a curved adjuster track assembly.

A further feature of the invention is the provision of a latching device in a vehicle seat adjuster which permits fore and aft adjusting movement of only one end of the seat and prevents latching of the seat adjuster track associated with the one end of the seat until the one end of the seat is returned to its normal position in transverse alignment with the other end of the seat.

These and other features, objects and advantages of the invention will become apparent upon consideration of the specification and the appended drawings in which:

FIG. 6 is a sectional view taken in the direction of arrows 6—6 of FIG. 1;

FIG. 7 is a sectional view taken in the direction of arrows 7—7 of FIG. 1;

FIG. 8 is a sectional view taken in the direction of arrows 8—8 of FIG. 1;

FIG. 9 is a sectional view taken in the direction of arrows 9—9 of FIG. 2;

FIG. 10 is a sectional view taken in the direction of arrows 10—10 of FIG. 2; and FIG. 11 is a sectional view taken in the direction of arrows 11—11 of FIG. 2.

Figure 1:
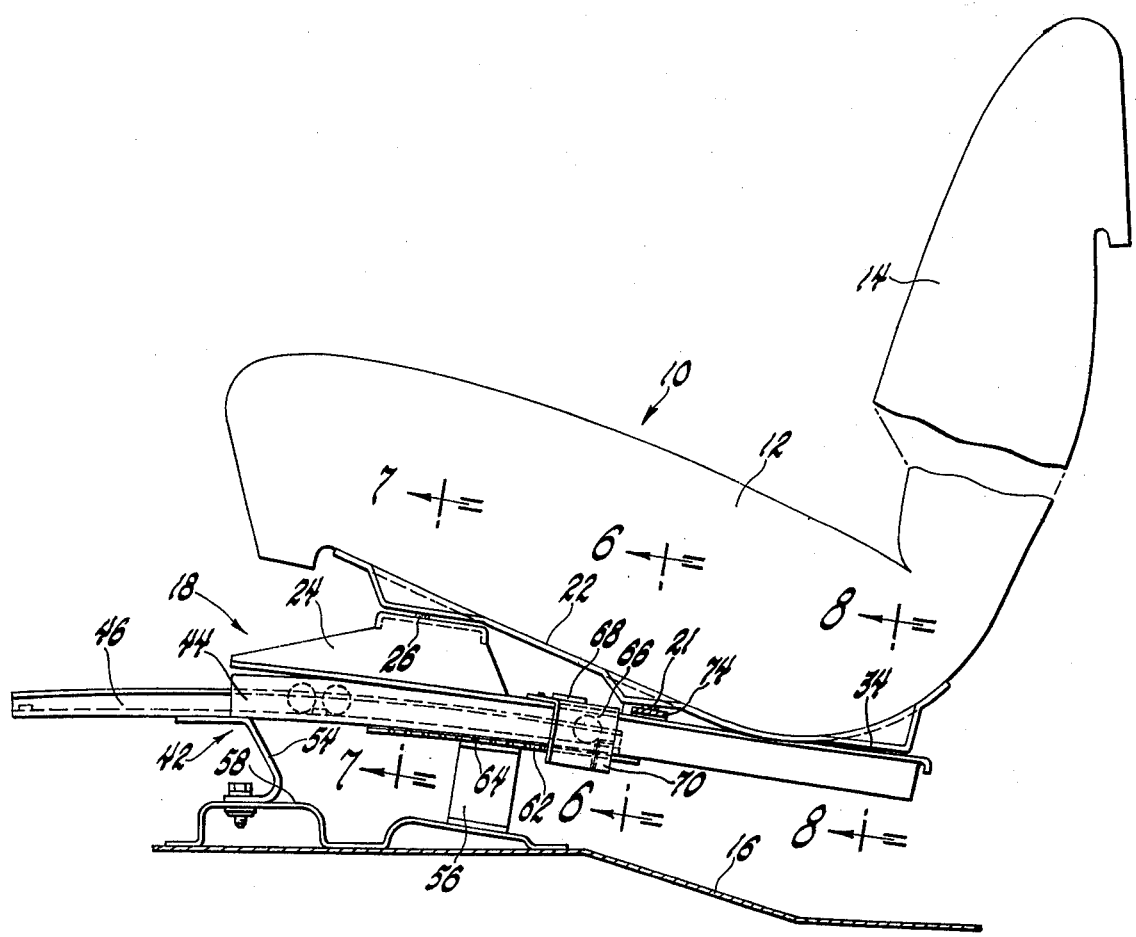
FIG. 1 is a side elevation view of the driver's end of the vehicle seat.
Figure 2:
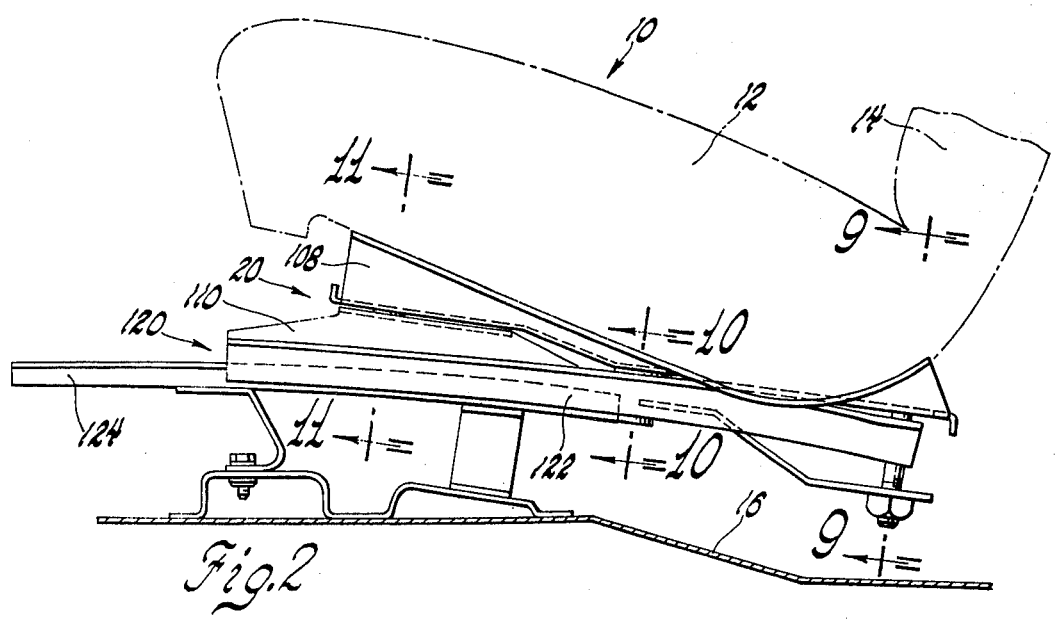
FIG. 2 is a side elevation view of the passenger's end of the vehicle seat.

Referring to FIG. 1, a vehicle seat generally indicated at 10 includes a seat cushion 12 and a seat back 14. As seen in FIG. 1, the driver's end of the seat 10 is mounted on the floor pan 16 of the vehicle by a swivel adjuster mechanism indicated generally at 18. As seen in FIG. 2, the passenger's end of the seat 10 is mounted on the floor pan 16 by a swivel adjuster mechanism indicated generally at 20.

SWIVEL ADJUSTER MECHANISM AT DRIVER'S END OF SEAT

Figure 5:
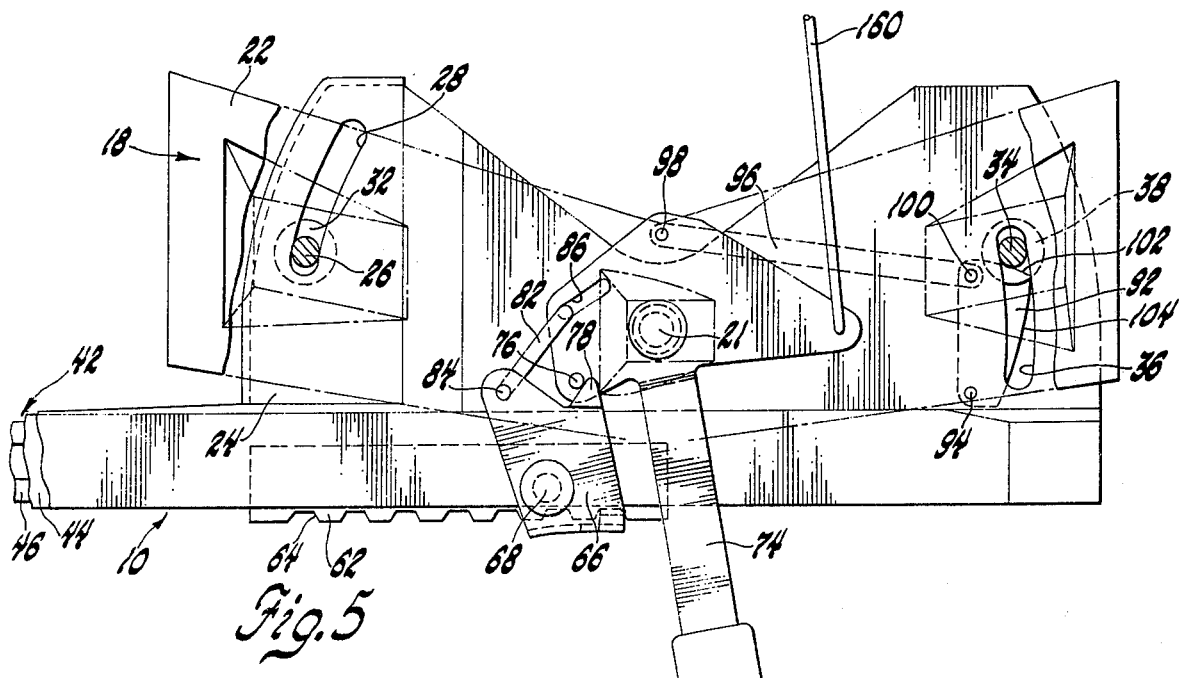
FIG. 5 is an enlarged fragmentary view of the seat adjuster mechanism at the driver's end (FIG. 1) of the vehicle seat.

As best seen in FIGS. 1 and 5, a stamped steel base plate 22 is attached to the underside of the seat 10 at the left hand or driver's end thereof. Referring to FIG. 6, a central pivot pin 21 pivotally connects the center of base plate 22 to the center of a mounting plate 24. As best seen in FIGS. 5 and 7, the forward end of the base plate 22 is connected to the forward end of the mounting plate 24 by a pin 26 which is staked to the base plate 22 and rides in a curved slot 28 of the mounting plate 24. The curved slot 28 of the mounting plate 24 is arcuate about central pivot pin 21. A washer 32 is held on the pin 26 by swaging the pin. Referring to FIGS. 5 and 8, the rear end of the base plate 22 is similiarly attached to the mounting plate 24 by a pin 34 which rides in a curved slot 36 provided in the mounting plate 24. A washer 38 is retained on the end of the pin 34. Thus it is apparent that the base plate 22 can pivot on the mounting plate 24 about the central pivot pin 21 as permitted by the movement of pins 26 and 34 in their respective curved slots 28 and 36 on the mounting plate 24. The pins 26 and 34 also prevent pitch movement of the seat 10 relative the mounting plate 24.

The mounting plate 24 is attached to the floor pan 16 of the vehicle by a conventional seat adjuster track assembly indicated generally at 42. As best seen in FIG.

7, the track assembly 42 includes an upper track 44 and a lower track 46 captured within the upper track 44. Rollers 48 and balls 50 are captured between the upper track 44 and a lower track 46 as shown in FIG. 7 to provide relatively frictionless fore and aft movement of the upper track 44 on the lower track 46. As best seen in FIG. 1, the upper track 44 and lower track 46 are curved so that the elevation and pitch of the seat 10 vary as the seat is adjusted fore and aft. The lower track 46 is conventionally attached to the vehicle floor pan 16 by brackets 54, 56 and 58 as shown in FIG. 1.

As best seen in FIGS. 1 and 5, a lock plate 62 is attached to the underside of the lower track 46 as by welding. The lock plate 62 has notches 64 spaced along the length thereof. The upper track 44 is locked in position relative the lower track 46 by a lock pawl 66 which is pivotally attached to the mounting plate 24 and upper track 44 by a pivot 68 as seen in FIG. 5. The pivot 68 permits pivotal movement of the lock pawl 66 between the latched position of FIGS. 5 and 6 in which a leg 70 of the lock pawl 66 is engaged in one of the notches 64 of the lock plate 62 and an unlatched position in which the leg 70 is removed from the notch 64 to permit fore and aft movement of the upper track 44 on the lower track 46. Referring to FIG. 6, the central pivot 21 pivotally mounts an actuating lever 74 on the mounting plate 24. As seen in FIG. 5, the actuating lever 74 has an upstanding pin 76 attached thereto which engages an ear 78 of the lock pawl 66 so that the lock pawl 66 is rotated clockwise to remove its leg 70 from the notch 64 of the lock plate 62 when the actuating lever 74 is moved in the counterclockwise direction. The adjusting lever 74 and lock pawl 66 are also connected by a link 82 which has its one end connected to lock pawl 66 by a pivot 84 and its other end riding in a slot 86 in the actuating lever 74. When the actuating lever 74 is pivoted clockwise, the lock pawl is also pivoted clockwise to unlatched position. Thus, pivoting the actuating lever in either direction will unlatch the lock pawl 66.

Referring to FIGS. 5 and 8, it will be seen that a blocking link 92 has its one end pivotally connected to the mounting plate 24 by a pivot 94. The other end of the blocking link 92 is operatively connected to the actuating lever 74 by a link 96, the ends of the link 96 being respectively pivotally connected to the actuating lever 74 and the blocking link 92 by pivots 98 and 100. As seen in FIG. 5, when the actuating lever 74 is in its normal unactuated position of FIG. 5, the link 96 positions the blocking link 92 so that a cam surface 102 on the end of the blocking link 92 is engaged by the pin 34. Upon counterclockwise pivotting of the actuating lever 74, the connecting link 96 rotates blocking link 92 counterclockwise about pivot 94 to carry the cam surface 102 out of blocking engagement of the pin 34, thus permitting the pin to traverse to curved slot 34 as the base plate 22 pivots clockwise about the central pivot pin 21. When the base plate 22 is pivoted about the central pivot 21 in this manner, the pin 34 is engaged by a cam surface 104 on the blocking link 92, thereby preventing return of the blocking link 92 and the actuating lever 74 to their normal positions of FIG. 5. It will thus be apparent that the actuating lever 74 and its pin 76 hold the lock pawl 66 in unlatched position relative the notched lock plate 62 whenever the base plate 22 is pivoted clockwise relative the mounting plate 24.

SWIVEL ADJUSTER MECHANISM AT PASSENGER'S END OF SEAT

Figure 4:
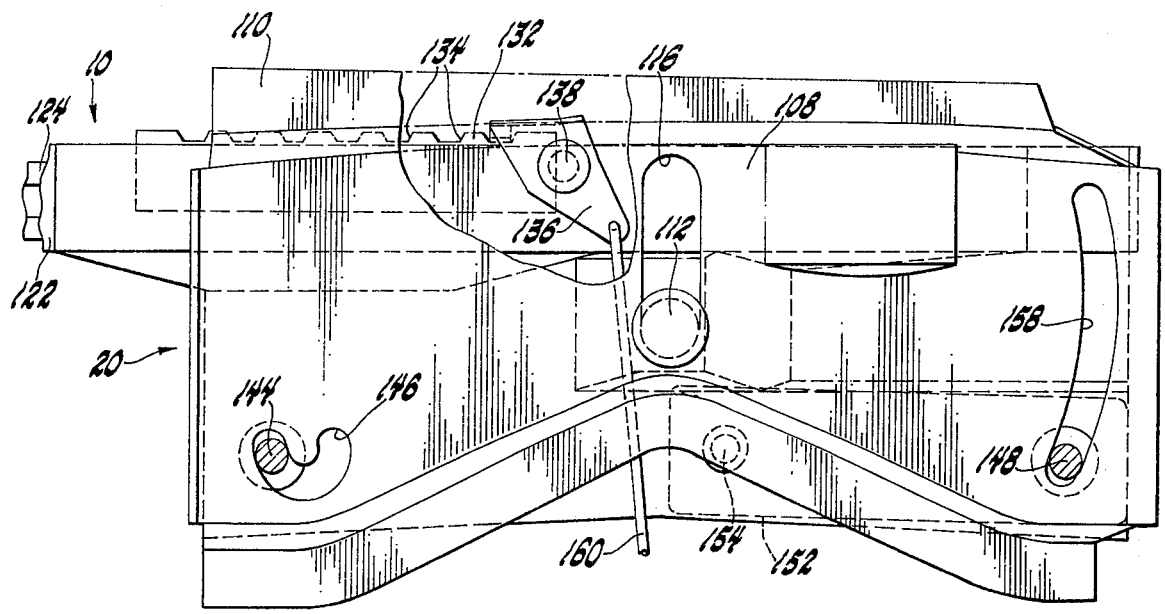
FIG. 4 is an enlarged fragmentary view of the seat adjuster mechanism at the passenger's end (FIG. 2) of the vehicle seat.

Referring to FIG. 2, the swivel adjuster mechanism 20 at the passenger's end of the seat 10 is shown. A base plate 108 is attached to the underside of the seat 10 and has its center portion pivotally connected to a mounting plate 110 by a central pivot 112 as best seen in FIG. 10. The central pivot pin 112 extends substantially beneath the mounting plate 110 and seats a compression spring 114 which acts between the central pivot pin 112 and mounting plate 110 to yieldably hold the base plate 108 down in contact with the mounting plate 110 but permit the base plate 108 to be lifted off the mounting plate 110 upon yielding of the compression spring 114. The base plate 108 has a transversely extending slot 116 in which the pivot pin 112 rides to permit movement of the base plate 108 laterally inward of the vehicle. The mounting plate 110 is attached to the floor pan 16 of the vehicle by a conventional seat adjuster track assembly, indicated generally at 120. The seat adjuster track assembly 120 is constructed identically to the seat adjuster track assembly 42 of the driver's end of the seat and, as best seen in FIG. 10 includes an upper track 122 and a lower track 124 having rollers 126 and balls 128 captured therebetween. A lock plate 132 is attached to the underside of the lower track 124 and has notches 134 displayed along its length as seen in FIG. 4. As best seen in FIG. 4, a lock pawl 136 is pivotally mounted on the mounting plate 110 by a pivot 138 and has a leg 140, FIG. 10, which is selectively engageable in one of the notches 134 to lock the upper track 122 against movement relative the lower track 124.

Referring to FIG. 11, the forward end of the base plate 108 is pivotally connected to the forward end of mounting plate 110 by a pin 144. As seen in FIGS. 4 and 11, the base plate 108 has a slot 146 in which the pivot pin 144 rides when the base plate 108 pivots relative the mounting plate 110 about the central pivot pin 112. Referring to FIG. 9, the rearward end of the base plate 108 is connected to the rearward end of mounting plate 110 by a bolt 148 which extends substantially below the mounting plate 110 and has a nut 150 on the end thereof which mounts the end of a leaf spring 152. The other end of the spring 152 is attached to the mounting plate 110 by a rivet 154, as best seen in FIGS. 4 and 9. It will be apparent that the leaf spring 152 yieldably biases the bolt 148 downwardly to hold the base plate 108 in engagement of mounting plate 110 but will yield to permit the base plate 108 to move vertically relative the mounting plate 110. The base plate 108 has a curved slot 158 therein in which the bolt 148 is movable upon pivotal movement of the base plate 108 about the central pivot pin 112. Thus, it will be seen that the forward end of the base plate 108 may pivot and slide about the pin 144 while the center and rear of the base plate 108 can move pivotally and slidably as well as vertically at the central pivot pin 112 and the bolt 148.

OPERATION

Figure 3:
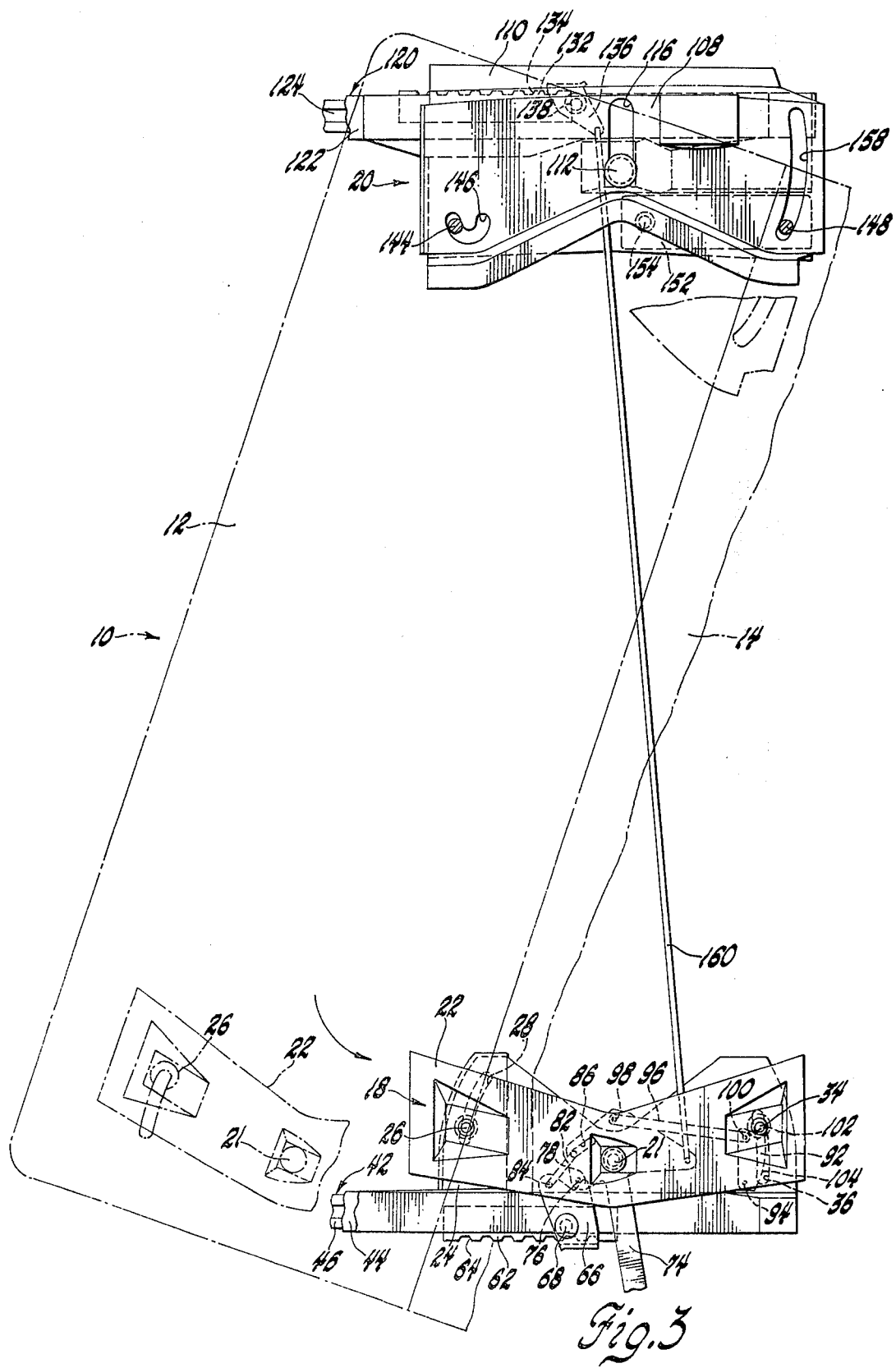
FIG. 3 is a plan view of the vehicle seat.

Referring to FIG. 3, the operation of the seat adjusting mechanism of the invention will be described. The solid lines of FIG. 3 show the driver's end swivel adjuster mechanism 18 and the passenger end swivel adjuster mechanism 20 in their normal positions. The lock pawls 66 and 136 are both in their normal latched positions preventing both fore and aft adjusting and swiveling movement of the ends of the seat.

When it is desired to adjust the vehicle seat either fore or aft to vary the position of the vehicle driver relative the vehicles operating controls, the driver actuates the actuating lever 74, as best seen in FIG. 5, in the clockwise direction. Link 82 connects the actuating lever 74 and lock pawl 66 causing the lock pawl 66 to be rotated clockwise about pivot 68 to carry the leg 70 of the lock pawl 66 out of engagement of the notched lock plate 62. The lock pawl 136 of the adjuster track assembly 120 is connected to the actuating lever 74 by an actuating cable 160 so that when the actuating lever 74 is pivoted clockwise, lock pawl 136 is also pivoted clockwise to its unlatched position. Thus, the lock pawls 66 and 136 are simultaneously moved to unlatched position when the actuating lever 74 is pivoted clockwise. Simultaneous unlatching of the lock pawls 66 and 136 permits the vehicle seat to move bodily fore or aft on the seat adjuster track assemblies 42 and 120. As the seat 10 is adjusted fore and aft on the adjuster track assemblies, the elevation and pitch of the seat are also varied by virtue of the seat adjuster track assemblies being curved as best seen in FIGS. 1 and 2. The lock pawls 66 and 136 are preferably biased to their normal latched position by springs, not shown, so that when the actuating lever 74 is returned to its normal position the lock pawls 66 and 136 will assume their normal latched positions to latch the seat 10 in the adjusted position.

When it is desired to adjust only the driver's end of the vehicle seat 10 forwardly in order to facilitate access to the rear seat, particularly in a two-door vehicle, the actuating lever 74 is pivoted in the counterclockwise direction. Counterclockwise pivoting of the actuating lever 74 causes the upstanding pin 76 carried on the actuating lever 74 to engage the ear 78 of the lock pawl 66 and pivot the lock pawl 66 about its pivot 68 to the unlatched position. The counterclockwise movement of actuating lever 74 also causes the connecting cable 160 to fall slack so that the latch pawl 136 at the passenger's end of the seat remains latched. Unlatching of the lock pawl 66 permits the driver's end of the seat to be adjusted forwardly. As the driver's end is adjusted forwardly, the upper track 44 moves forwardly relative the lower track 46. The mounting plate 24 moves forwardly with the upper track 42. Since the passenger's end of the seat does not move forwardly, the base plate 22 at the driver's end of the seat pivots about the central pivot pin 21. As the base plate 22 pivots, the pins 26 and 34 mounted thereon ride in the respective slots 28 and 36 of the base member 24. The forwardly adjusted and swiveled position of the driver's end of the seat is shown in the phantom lines of FIG. 3.

As the driver's end of the seat is adjusted forwardly and swiveled, the passenger's end of the seat 10 also swivels as provided by pivoting of the base plate 108 on the central pivot pin 112. As the seat is swiveled, it also shifts laterally as permitted by movement of the base plate 108 on the central pivot pin 112 as permitted by the slot 116 of the base plate 108. The pin 144 and the bolt 148 traverse the respective slots 146 and 158 as the base plate 108 swivels and moves laterally on the mounting plate 110 to the phantom line indicated positions of FIG. 3.

As the driver's end of the seat is adjusted forwardly on the curvilinear adjuster track assembly 120, the seat 10 is pitched forwardly. The passenger's end of the seat 10 is not adjusted forwardly on its curvilinear adjuster track assembly 120 and accordingly provision must be made to allow for forward pitching movement of the seat about the passenger's end thereof. This forward pitching movement of the seat is accommodated by yielding of the coil spring 114 which surrounds the central pivot pin 112 and yielding of the leaf spring 152 which act on the bolt 148. Yielding of the coil spring 114 and the leaf spring 152 permit the rear end of the base plate 108 to be elevated off the mounting plate 120 to accommodate forward pitch movement of the seat 10.

Provision is made to prevent the lock pawl 66 from returning to the normal latched position until the base plate 22 is returned to its normal unpivoted position relative the mounting plate 24 as seen in FIG. 5. This feature is provided by the blocking link 92. When the actuating lever 74 is pivoted counterclockwise, the link 96 pivots blocking lever 92 about its pivot 94 to carry the cam surface 102 out of engagement with the pin 34. As the base plate 22 pivots on the central pivot pin 21, the pin 34 traverses the slot 36 and engages the cam surface 104 of the blocking link 92, thereby preventing the blocking link 92 from pivoting and returning to its normal position of FIG. 5. Thus, whenever cam surface 104 is engaged by the pin 34, the actuating lever 74 is held in the counterclockwise position and the lock pawl 66 is held in unlatched position. When the driver's end of the seat is moved rearwardly, the pin 34 returns along the slot 36 and as it reaches its preadjustment position, the pin 34 leaves cam surface 104 permitting the blocking link 92 to return to its normal position of FIG. 5 and in turn allowing the actuating lever 74 and lock pawl 66 to return to their normal latched position. Thus, it is assured that the driver's end of the seat is always returned to a position in line with the passenger's end of the seat after each swivel adjust movement of the driver's end to facilitate access to the rear seat.

It will be apparent that the swivel seat adjusting mechanism shown in the drawings and described herein may be modified without departing from the scope of the invention. For example, the device could be modified to permit swiveling adjustment of the passenger's end of the seat as well as the driver's end. This would be accomplished by providing a duplicate of the actuating lever and blocking link on the passenger's end of the seat and modifying the swivel adjust mechanism 18 of the driver's end by modifying the central pivot 21 and pin 34 to accommodate vertical and lateral movement as permitted by the central pivot 112 amd bolt 148 of the passenger's end swivel mechanism 20.

Thus, it is seen that the invention provides an improved seat adjusting mechanism for a vehicle seat.

What is claimed is:

1. A seat adjusting mechanism for a vehicle seat comprising: a first adjuster track assembly having a lower track mounted on the vehicle and an upper track, a first swivel means attaching the upper track of the first adjuster track assembly to one end of the vehicle seat, a first latch means acting between the upper and lower tracks of the first adjuster track assembly and having a normal latched position to lock the one end of the seat against fore and aft movement, a second adjuster track assembly having a lower track mounted on the vehicle and an upper track, a second swivel means attaching the upper track of the second adjuster track assembly to the other end of the vehicle seat and permitting simultaneous pivoting and lateral shifting movement of the other end of the seat relative the upper track of the second adjuster track assembly, a second latch means acting between the upper and lower tracks of the second track assembly and having a normal latched position to lock the other end of the seat against fore and aft movement, and latch operating means having a normal position corresponding to normal latched position of the first and second latch means and being connected to unlatch both the first and second latch means when moved in one direction to permit simultaneous fore and aft adjusting movement of the seat on the first and second adjuster track assemblies and to unlatch only the first latch member when moved in the other direction so that only the first end of the vehicle seat is moved fore and aft and the seat pivots about the first and second swivel means and is shifted laterally relative the second track assembly, and blocking means responsive to the relative pivotal position between the first end of the seat and the first adjuster track assembly and being effective to maintain the first latch means in unlatched position when the first end of the vehicle seat is pivoted relative the first adjuster track assembly to assure rearward return of the first end of the seat into transverse alignment with the second end of the seat before the first latch means returns to normal latched position.

2. A seat adjuster mechanism for a vehicle seat comprising: first and second adjuster track assemblies respectively mounting the first and second ends of the vehicle seat on the vehicle body, first and second swivel means respectively in connection between the first and second adjuster track assemblies and the first and second ends of the vehicle seat to permit pivoting movement of the vehicle seat relative the respective adjuster track assemblies, first and second latch means associated respectively with the first and second adjuster track assemblies, and being movable between latched and unlatched positions to permit fore and aft adjusting movement of the associated end of the vehicle seat, latch operating means actuatable to unlatch the first latch means to permit forward movement of the first end of the vehicle seat, the first and second means pivoting the first and second ends of the vehicle seats relative the respective first and second adjuster track assemblies upon forward movement of the first end of the vehicle seat, and blocking means responsive to the relative pivotal position between the first end of the seat and the first adjuster track assembly and being effective to maintain the first latch means in unlatched position when the first end of the vehicle seat is pivoted relative the first adjuster track assembly to assure rearward return of the first end of the seat into transverse alignment with the second end of the seat before the first latch means returns to normal latched position.

* * * * *